UNITED STATES PATENT OFFICE 2,669,249

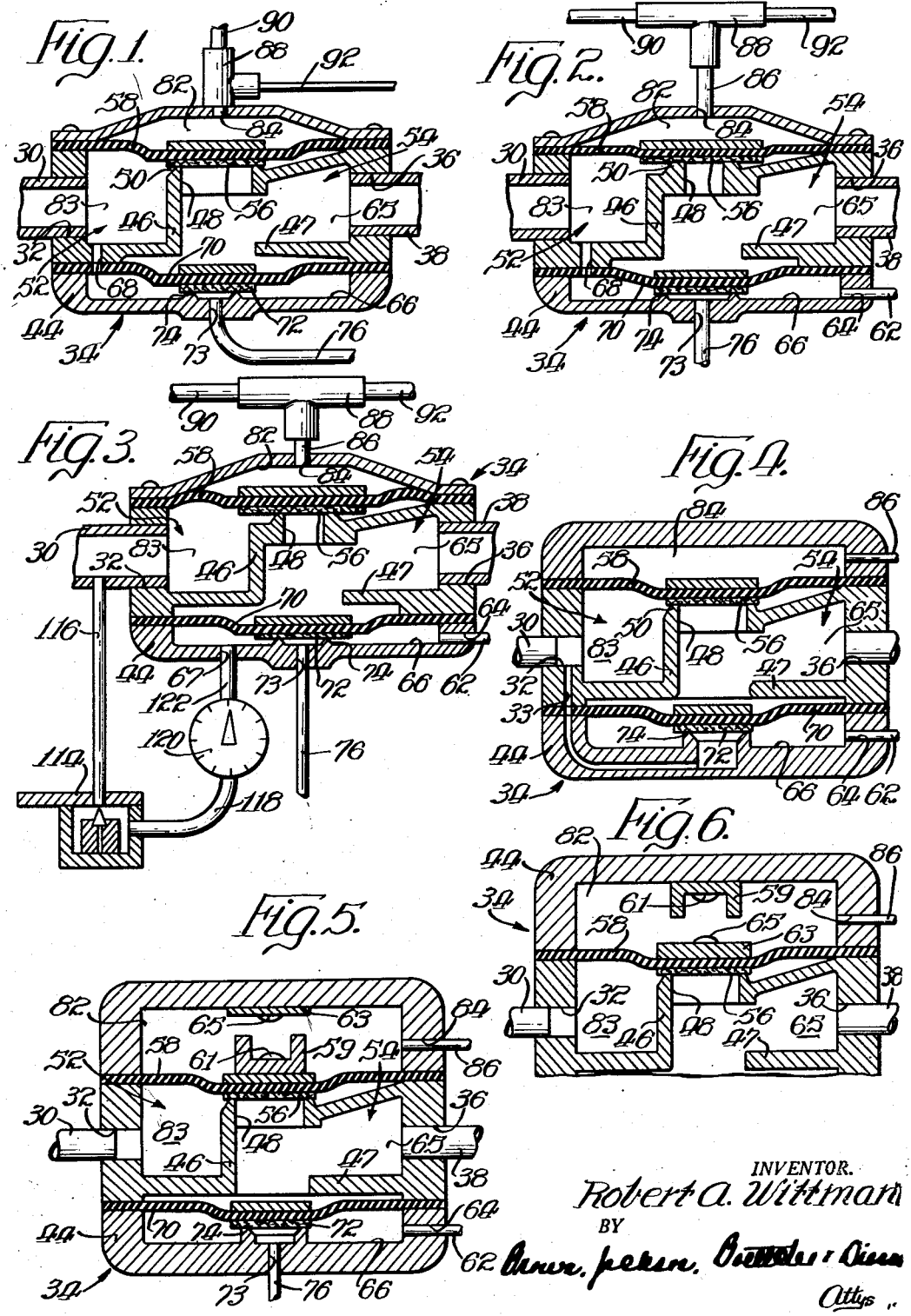

DIAPHRAGM VALVE

Robert A. Wittmann, Chicago, Ill.

Application November 2, 1949, Serial No. 124,959

14 Claims. (Cl. 137—115)

This invention relates to valve mechanisms and more particularly to valve mechanisms employing a movable valve member carried by a diaphragm.

This application is a continuation-in-part of my copending application, Serial No. 767,707, filed August 9, 1947.

Among the objects of this invention are to provide a valve mechanism having a movable valve member carried by a diaphragm which is responsive to differences in pressures acting on opposite sides of the diaphragm for controlling the position of the movable valve member with respect to a valve seat; magnetic control means which will permit the valve member to be effectively employed when low pressures are acting on the diaphragm and which will prevent fluttering of the movable valve member; a valve mechanism employing a plurality of movable valve members carried by a plurality of diaphragms whereby the flow of fluids through a plurality of conduits may be controlled in response to variations in pressure existing in said conduits and in the associated chambers of said valve mechanism; and a valve mechanism which is sturdy and reliable, compact, and easy to assemble or disassemble.

Other objects, uses and advantages will become apparent, or be obvious, from the following description when taken with the drawings in which:

Figure 1 illustrates a valve mechanism embodying my invention;

Figure 2 illustrates the valve mechanism of Figure 1 with an additional passageway through the casing;

Figure 3 illustrates a valve mechanism similar to that of Figure 1 with additional passageways through the casing and with an associated external conduit;

Figure 4 illustrates a valve mechanism similar to that of Figure 1 with a passageway disposed in the casing wall;

Figure 5 illustrates a valve similar to that of Figure 1 with one valve member carrying a magnet and with the casing carrying a magnetically permeable member; and Figure 6 is a fragmentary view of the valve mechanism of Figure 5 showing the magnet and magnetically permeable member reversed in position.

Turning now to Figure 1 of the drawings, the valve mechanism, indicated generally by the reference numeral 34, comprises a casing 44 which is internally divided into two parts by a wall 46 which also defines a passageway 48. A valve seat 50 is located at the upper end of the passageway 48. A conduit 30 may be threaded, or otherwise secured, in the inlet 32 and opens into the inlet chamber, which is indicated generally by the reference numeral 52. The inlet chamber is connected with the outlet chamber, indicated generally by the reference numeral 54, by means of the passageway 48, which may be closed by a valve member 56 carried by a flexible diaphragm 58. The outlet 36 is adapted to have a conduit 38 secured in it. The diaphragm 58 extends across and divides the inlet chamber 52 of casing 44 into a first chamber 82 and a second chamber 83, the latter communicating directly with the inlet 32. The third chamber 65 communicates directly with the outlet 36. The flexible diaphragm 58 is secured by its margins to the casing 44 in a suitable manner to prevent passage of fluid between the first and second chambers. It will be apparent that with the valve mechanism 34 disposed as shown, gravity will act upon the diaphragm 58 and the valve member 56 and will tend to seat the valve member 56 upon the valve seat 50.

The outlet chamber 54 of the valve mechanism 34 is divided into a third chamber 65 and a fourth chamber 66 by a flexible diaphragm 70 which carries a valve member 72. A passageway 68 extends between the second chamber 83 and the fourth chamber 66 as by passing through apertures in the wall means 46 and flexible diaphragm 70. Another passageway 73, in the form of an opening through the casing 44, extends into the fourth chamber and is adapted to accommodate a conduit 76. Passageways 68 and 73 have a smaller effective cross sectional area than do the inlet 32 and the passageway 48. A seat 74 may be disposed about the inner end of passageway 73 for cooperation with the valve member 72 which is carried by the flexible diaphragm 70. It will be seen that a portion of the wall means 46 and an extending wall portion 47 of the casing 44 are so disposed above the flexible diaphragm 70 as to limit the upward movement thereof when the valve member 72 is lifted from its seat.

A passageway 84 extends into said first chamber 82 and may take the form of an opening through the casing 44, as shown. Passageway, or opening, 84 has a smaller effective cross sectional area than does the inlet 32. A single conduit may be disposed in the passageway 84 or a T-connection, such as the connection 85, may be connected therewith for communicating the passageway 84 with conduits such as the conduits 90 and 92.

It will be readily seen that if the total forces exerted by fluid in the first chamber 82 on the surface of diaphragm 58, together with the forces of gravity acting on the diaphragm 58 and the valve member 56, exceed the total forces exerted upwardly by fluid against the exposed under surface of the diaphragm 58, then the diaphragm will be urged downwardly and the valve member 56 will be seated upon the valve seat 50. When that condition is reversed, that is, the total force acting underneath the diaphragm 58 exceeds the total force, including the force of gravity, acting downwardly, the valve member 56 will be unseated and fluid under pressure may flow from the second chamber 83 through the passageway 48 into the third chamber 65 and thence to the outlet 36 and the conduit 38.

To illustrate the action of the valve 56, assume, for example, that fluid of equal pressure enters the first chamber 82 through conduit 90 and the second chamber through conduit 30 and that conduit 92 to the T-connection 88 is blocked. Then the total forces acting downwardly with respect to diaphragm 58 and valve 56 will exceed the total forces acting upwardly because the exposed portion of the upper surface of the diaphragm 58 is larger and because of the additional force exerted by gravity on said diaphragm and the valve member. Then the valve member 56 will be seated on the seat 50. Then assume that conduit 92 is unblocked so that fluid under pressure coming through conduit 90 may then flow through said conduit 92. That may relieve the pressure on the upper side of the diaphragm 58, whereupon the greater forces acting upwardly will unseat the valve member 56 by pushing the diaphragm 58 upwardly. The second chamber 83 and the third chamber 65 are then put into communication through the passageway 48. The valve member 56 will continue to be unseated because of the large flow of gas through the large conduit 30, providing a total force upwardly against the diaphragm 58 greater than the downward forces including the forces exerted by gravity. If the flow of gas through conduit 30 is cut off, then diaphragm 58 will drop and seat the valve 56. It will be apparent that the control of gas under pressure in chamber 82 could be by automatic or manually controlled means interposed in a single conduit such as conduit 90, or in a conduit such as conduit 92, and that such means could be remote from the casing 44 or could be carried by said casing.

For an example of the operation of the valve member 72, let us assume that conduit 92 is blocked and that fluid under equal pressure is acting in the first chamber and the second chamber. By reason of the passageway 68 between the second chamber 83 and the fourth chamber 66, equal pressure will exist not only in the first and second chambers but also in the fourth chamber. If the third chamber 65 is substantially at atmospheric pressure, then the fluid under pressure in chamber 66 will exert a greater total upward force than the total downward force, including the force of gravity acting on the flexible diaphragm 70 and valve member 72. The result will be that the diaphragm 70 is driven upwardly and will carry with it the valve member 72 and chamber 66 will thereby be brought into communication with the passageway 73 and the conduit 76. However, when the diaphragm 58 is raised and thereby unseats the valve member 56, the total forces acting downwardly on the flexible diaphragm 70 and the valve member 72 will exceed the upward forces and will serve to seat the valve member 72 on the seat 74 and close off fourth chamber 66 from the conduit 76. That is to say, when the valve member 56 opens, the valve member 72 closes.

Turning now to Figure 2, the valve mechanism 34 is the same in all respects as that shown in Figure 1, except for the second passageway 64, in the form of an opening through the casing 44, which leads into the fourth chamber 66. The passageway 64, as may be seen, has direct communication through the fourth chamer 66 with the passageway 68 which leads between the second chamber 83 and the fourth chamber 66. A conduit 62 may be disposed in passageway 64. When the valve member 72 carried by diaphragm 70 is moved from its seat 74, the passageway 68 is in communication with both the conduit 76 and the conduit 62. For some applications of the valve wherein the additional passageway 64 is of use, reference may be made to my copending application, Serial No. 767,707, filed August 9, 1947.

The valve mechanism illustrated in Figure 3 is substantially the same as that illustrated in Figures 1 and 2. The passageway 64 which extends into the chamber 66 is present but in lieu of the passageway 68 of Figure 1 (which passageway extends from the second chamber 83 to the fourth chamber 66 through apertures in the wall means 46 and the flexible diaphragm 70) there is substituted a passageway 67, in the form of an opening through the casing 44, which extends into direct communication, through the chamber 66, with the passageway 64. The passageway 67 may be employed for a variety of purposes but, by way of example, it will be seen that said passageway may have a conduit 122 secured in it and said conduit may communicate through a timing valve 120 and conduit 118 and temperature responsive valve 114 and conduit 116 with the conduit 30 which has direct communication with the second chamber 83. It will be seen that the conduits 116, 118 and 122 may take the place of an internal passageway, such as the passageway 68 of Figure 1, so that additional control mechanism may be employed. When the diaphragm 70 is raised and moves the valve member 72 from its seat 74, the passageways 67, 73 and 64 may communicate with each other.

In Figure 4 the valve mechanism 34 is similar to that of Figure 1 and the various elements which are the same are identified by the same reference numerals, as has been the case with Figures 2 and 3. The primary difference between the valve mechanism of Figure 4 and that of Figure 1 lies in the substitution for passageway 68 of a passageway 33 from the inlet 32 through the wall of the casing 44 to the fourth chamber 66, with the valve member 72 being disposed to close off the passageway 33, at said fourth chamber. A passageway 64, in the form of an opening through the casing 44, communicates with the passageway 33 when the valve 72 is carried upwardly by the flexible diaphragm 70.

In Figure 5 the valve mechanism 34 is similar to that illustrated in Figure 4, except that the passageway 33 is not employed and a passageway 73, in the form of an opening through the casing 44, is employed, with the valve member 72 being disposed above it. The diaphragm 58 carries a magnet 59 which is disposed in superimposed relationship with respect to the valve member 56. The magnet 59 may be connected to the valve member 56 by securing means such as the screw 61 or may be secured above the valve member 56 by being connected with the flexible diaphragm itself. While the magnet might be an electro-magnet, I prefer to employ a permanent magnet. Above the permanent magnet 59 there is disposed a member 63 of high magnetic permeability to which the magnet 59 will be attracted when the diaphragm 58 rises and unseats the valve member 56 from its seat 50. The member 63 may be carried by the casing 44, as by a screw 65. The member 63 should be highly permeable in order that its size may be reduced and it could, of course, form a portion of the casing 44, be an inset therein, or be disposed on the outer surface of the casing 44, if desired. The valve 56, when in its open position, tends to remain so while fluid under pressure is passing from the second chamber 83 through the passageway 48 into the third chamber 65. When the velocity of the gas is reduced, or the pressure is cut down, there may be times when it is desirable to have the valve 56 remain in its open position, and the small permanent magnet 59 will hold it open under such conditions. Under some operating conditions the permanent magnet will also serve to prevent fluttering of the diaphragm.

Referring now to Figure 6, it will be seen that the relative positions of the magnet 59 and of the highly permeable member 63 may be reversed, without departing from the scope of the invention. With such structure the magnetic member 59 and the permeable member 63 will still function in the desired fashion, and the flexible diaphragm 58 and valve member 56 will also operate satisfactorily.

The magnet 59 and permeable member 63 may also be employed in each of the valves illustrated in Figures 1 through 4, as will be readily apparent.

While I have described preferred forms of the invention, I do not intend to be limited thereto, except insofar as the following claims are so limited, since various changes and modifications coming within the scope of the invention will suggest themselves to those skilled in the art by reason of my disclosure.

I claim:

1. Means for controlling the flow of fluids in a conduit, said means comprising, in combination, a fluid-tight casing adapted to be interposed in the conduit and having a fluid inlet and a fluid outlet, an inlet chamber and an outlet chamber within the casing with wall means separating the chambers and defining a passageway between the chambers, a valve seat at one end of said passageway, a second passageway, said second passageway leading into the inlet chamber, a third passageway, said third passageway leading into the outlet chamber, a first diaphragm in said inlet chamber separating the fluid inlet from said second passageway, a second diaphragm in said outlet chamber separating the fluid outlet from said third passageway, a first valve member carried by said first diaphragm and adapted to engage said valve seat to close said first mentioned passageway, and a second valve member carried by the second diaphragm and adapted to close said third passageway.

2. The controlling means of claim 1 wherein at least a portion of said wall means serves to limit the movement of said second valve carried by the second diaphragm from its closed position with respect to said third passageway.

3. Means for controlling the flow of fluids in a conduit, said means comprising, in combination, a fluid-tight casing adapted to be interposed in the conduit and having a fluid inlet and a fluid outlet, an inlet chamber and an outlet chamber within the casing with wall means separating the chambers and defining a passageway between the chambers, a valve seat at one end of said passageway, an opening through the casing leading into the inlet chamber, a pair of openings through the casing leading to the outlet chamber, a first diaphragm in said inlet chamber separating the fluid inlet from said first mentioned opening, a second diaphragm in said outlet chamber separating the fluid outlet from said pair of openings, a valve member for said valve seat carried by said first diaphragm and adapted to close said passageway, and a valve member carried by the second diaphragm and adapted to close one of said pairs of openings.

4. Means for controlling the flow of fluid in a conduit, said means comprising, in combination, a fluid-tight casing adapted to be interposed in the conduit and having a fluid inlet and a fluid outlet, wall means dividing the interior of the casing into two parts and defining a passageway between said parts, said first part being divided by a first flexible member into a first chamber and a second chamber with the second chamber being connected directly with the fluid inlet and being connected by means of said passageway with a third chamber, said second part being divided by a second flexible member into said third chamber and a fourth chamber, with the third chamber being connected directly with the fluid outlet, a passageway interconnecting the second chamber with the fourth chamber, an opening through the casing into said fourth chamber, a passageway into said first chamber, a first valve member carried by said first flexible member and adapted to close said passageway between the second and third chambers, and a second valve member carried by said second flexible member and adapted to close said opening.

5. The controlling means of claim 4 together with a second opening through the wall of the casing into the fourth chamber, said second opening being in communication, by means of said fourth chamber, with the passageway leading from the second chamber to the fourth chamber.

6. The controlling means of claim 4 wherein the first valve member is adapted to close the passageway between the second and third chambers when the total forces exerted by fluid in the first chamber on said first flexible member, together with the force of gravity exerted on the first flexible member and the first valve member, exceeds the total forces exerted by fluid in said second chamber on said first flexible member to unseat said first valve member, and wherein the second valve member is adapted to close the opening through the casing into the fourth chamber when the total forces exerted by the fluid in the third chamber on the second flexible member, together with the force of gravity exerted on said second flexible member and second valve member, exceeds the total force exerted by fluid in the fourth chamber on the second flexible member to unseat said second valve member.

7. Means for controlling the flow of fluid in a conduit, said means comprising, in combination, a fluid-tight casing adapted to be interposed in the conduit and having a fluid inlet and a fluid outlet, wall means dividing the interior of the casing into two parts and defining a passageway between said parts, said first part being divided by a first flexible member into a first chamber and a second chamber with the second chamber being connected directly with the fluid inlet and being connected by means of the passageway with a third chamber, said second part being divided by a second flexible member into said third chamber and a fourth chamber, with the third chamber being connected directly with the fluid outlet, a passageway extending from the inlet chamber through the wall of the casing to the fourth chamber, a passageway leading into the first chamber, an opening through the casing leading into the fourth chamber, a first valve member carried by said first flexible member and adapted to close said passageway between the second and third chambers, and a second valve member carried by said second flexible member and adapted to close off, at said fourth chamber, the passageway through the wall of the casing which leads to the fourth chamber.

8. Means for controlling the flow of fluid in a conduit, said means comprising, in combination, a fluid-tight casing adapted to be interposed in the conduit and having a fluid inlet and a fluid outlet, wall means dividing the interior of the casing into two parts and defining a passageway between said parts, said first part being divided by a first flexible member into a first chamber and a second chamber with the second chamber being connected directly with the fluid inlet and being connected by means of the passageway with a third chamber, said second part being divided by a second flexible member into said third chamber and a fourth chamber, with the third chamber being connected directly with the fluid outlet, a passageway into the first chamber, three openings through the casing into the fourth chamber, a first valve member carried by said first flexible member and adapted to close the passageway between the second and third chambers, and a second valve member carried by said second flexible member and adapted to close off one of the openings into the fourth chamber from the other two openings of said fourth chamber.

9. Means for controlling the flow of fluid in a conduit, according to claim 1, including a permanent magnet connected with one of the valve members, and means carried by said casing toward which said magnet is adapted to be attracted when said one valve member is moved toward said means.

10. Means for controlling the flow of fluid in a conduit, according to claim 1, including a permanent magnet carried by the casing, and means connected with one of the valve members, which means is adapted to be attracted toward said magnet when said one valve member is moved toward said magnet.

11. Means for controlling the flow of fluids in a conduit, said means comprising, in combination, a fluid-tight casing adapted to be interposed in the conduit and having a fluid inlet and a fluid outlet, an inlet chamber and an outlet chamber within the casing with wall means separating the chambers and defining a passageway between the chambers, a valve seat at one end of said passageway, a second passageway, said second passageway leading into the inlet chamber, a third passageway, said third passageway leading to the outlet chamber, a first diaphragm in said inlet chamber separating the fluid inlet from said second passageway, a second diaphragm in said outlet chamber separating the fluid outlet from said third passageway, a valve member for said valve seat carried by said first diaphragm, and a valve member carried by the second diaphragm adapted to close said third passageway, a permanent magnet connected with the first-mentioned valve member, and means carried by said casing toward which said magnet is adapted to be attracted when said first-mentioned valve member is moved from the valve seat.

12. The control means of claim 1 wherein the second passageway has a smaller effective cross sectional area than the fluid inlet and the third passageway has a smaller effective cross sectional area than the first named passageway.

13. The control means of claim 1, in which the position of said first valve member is governed by the difference between the total forces acting in opposite directions with respect to said first diaphragm and first valve member including the fluid force from said inlet acting on one side of said first diaphragm and the fluid force in said second passageway acting on the other side thereof, the position of said second valve member being governed by the difference between the total forces acting in opposite directions with respect to said second diaphragm and second valve member including the fluid force in said outlet chamber, as governed by the position of said first valve member, acting on one side of said second diaphragm.

14. A valve comprising a casing having a fluid inlet and a fluid outlet, wall means in said casing dividing said casing into an inlet chamber and an outlet chamber and defining a valve port between said chambers, a first diaphragm positioned in said inlet chamber and having one surface thereof exposed to flow from said fluid inlet, first passageway means in said casing, the other side of said first diaphragm being exposed to fluid flow through said first passageway means, a first valve carried by said first diaphragm and normally biased by its own weight to close said port, a second diaphragm positioned in said outlet chamber and having one side exposed to flow through said fluid outlet, second passageway means in said casing, the other side of said second diaphragm being exposed to flow through said second passageway means, and a second valve carried by said second diaphragm and normally biased by its own weight to close said second passageway means, said first valve being adapted to be moved away from said port to open said port upon occurrence of greater total force on said one side of said first diaphragm than on said other side of said first diaphragm to accommodate flow of fluid from said inlet to said outlet, whereby said one side of said second diaphragm is subjected to fluid flow from said inlet tending to hold said second valve in position to close said second passageway means.

ROBERT A. WITTMANN.

References Cited in the file of this patent
UNITED STATES PATENTS

| Number | Name | Date |
| --- | --- | --- |
| 763,714 | Boekel | June 28, 1904 |
| 1,934,548 | Kellog | Nov. 7, 1933 |
| 2,235,304 | Toussaint | Mar. 18, 1941 |
| 2,244,555 | Harris | June 3, 1941 |
| 2,265,210 | Waddell | Dec. 9, 1941 |
| 2,490,420 | Davis | Dec. 6, 1949 |